United States Patent
Wen et al.

(10) Patent No.: US 10,628,958 B2
(45) Date of Patent: Apr. 21, 2020

(54) FRAME RENDERING APPARATUS, METHOD AND NON-TRANSITORY COMPUTER READABLE STORAGE MEDIUM

(71) Applicant: HTC Corporation, Taoyuan (TW)

(72) Inventors: Yu-You Wen, Taoyuan (TW); Chun-Hao Huang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 119 days.

(21) Appl. No.: 16/118,421

(22) Filed: Aug. 30, 2018

(65) Prior Publication Data

US 2019/0073786 A1 Mar. 7, 2019

Related U.S. Application Data

(60) Provisional application No. 62/554,526, filed on Sep. 5, 2017.

(51) Int. Cl.
*G06T 7/70* (2017.01)
*G09G 5/395* (2006.01)
(Continued)

(52) U.S. Cl.
CPC .............. *G06T 7/70* (2017.01); *G06F 3/011* (2013.01); *G06F 3/147* (2013.01); *G06T 7/215* (2017.01); *G06T 19/006* (2013.01); *G09G 5/395* (2013.01); *G06T 2207/30241* (2013.01); *G09G 2320/0693* (2013.01); *G09G 2320/103* (2013.01); *G09G 2354/00* (2013.01); *G09G 2360/18* (2013.01)

(58) Field of Classification Search
CPC ......... G06T 7/70; G06T 7/215; G06T 19/006; G06T 2207/30241; G06F 3/011; G06F 3/147; G09G 5/395; G09G 2320/0693; G09G 2320/103; G09G 2354/00; G09G 2360/18
See application file for complete search history.

(56) References Cited

U.S. PATENT DOCUMENTS

| | | | |
|---|---|---|---|
| 8,223,831 B2 * | 7/2012 | Lertrattanapanich | H04N 5/145 375/240 |
| 9,262,950 B2 * | 2/2016 | Sugden | G09G 3/003 |

(Continued)

OTHER PUBLICATIONS

European Search Report for corresponding European Application EP18192590, 2 pg. (dated 2019).*

*Primary Examiner* — Brenda C Bernardi
(74) *Attorney, Agent, or Firm* — CKC & Partners Co., LLC

(57) ABSTRACT

A frame rendering method used in a head-mounted device that includes the steps outlined below. Input frames are received. First and second orientation information corresponding to a first and a second input frames are retrieved from a motion sensor. Predicted orientation information of a predicted orientation corresponding to a target time spot is generated according to the first and the second orientation information. Orientation calibration is performed on the first and the second input frames according to the first and the second orientation information to respectively generate a first and a second calibrated frames corresponding to the predicted orientation. One of a plurality of extrapolated frames corresponding to the target time spot is generated according to the first calibrated frame and the second calibrated frame.

18 Claims, 3 Drawing Sheets

(51) Int. Cl.
    *G06F 3/01*          (2006.01)
    *G06F 3/147*        (2006.01)
    *G06T 7/215*        (2017.01)
    *G06T 19/00*       (2011.01)

(56) References Cited

U.S. PATENT DOCUMENTS

| | | | |
|---|---|---|---|
| 9,426,414 B2* | 8/2016 | Dane | H04N 5/145 |
| 2011/0261264 A1* | 10/2011 | Zafarifar | H04N 5/145 |
| | | | 348/699 |
| 2017/0213388 A1* | 7/2017 | Margolis | H04N 19/139 |
| 2019/0033961 A1* | 1/2019 | Croxford | A63F 13/25 |

* cited by examiner

FRAME RENDERING APPARATUS, METHOD AND NON-TRANSITORY COMPUTER READABLE STORAGE MEDIUM

RELATED APPLICATIONS

This application claims priority to U.S. Provisional Application Ser. No. 62/554,526, filed Sep. 5, 2017, which is herein incorporated by reference.

BACKGROUND

Field of Invention

The present invention relates to a frame rendering technology. More particularly, the present invention relates to a frame rendering apparatus and a frame rendering method.

Description of Related Art

In recent years, virtual reality technology is widely used in the fields such as gaming, engineering and military, etc. In order to experience the virtual reality environment, a user needs to view the displayed frames through the display apparatus disposed at such as, but not limited a head-mounted device wear by the user. However, high frame rate is important to achieve a fluent experience without motion sickness. In conventional technology, top-tier hardware setup is required to accomplish the desired fluency, which results in greater hardware cost.

Accordingly, what is needed is a frame rendering apparatus and a frame rendering method to address the issues mentioned above.

SUMMARY

An aspect of the present invention is to provide a frame rendering method used in a head-mounted device that includes the steps outlined below. A sequence of input frames are received. For each two of the consecutive input frames that include a first input frame corresponding to a first time spot and a second input frame next to the first frame and corresponding to a second time spot, the steps outlined below are performed. First orientation information corresponding to the first input frame and second orientation information corresponding to the second input frame are retrieved from a motion sensor of the head-mounted device. Predicted orientation information of a predicted orientation corresponding to a target time spot is generated according to the first orientation information and the second orientation information, wherein the target time spot is between the second time spot and a third time spot of a third input frame next to the second input frame. Orientation calibration is performed on the first input frame according to the first orientation information to generate a first calibrated frame corresponding to the predicted orientation and the orientation calibration is performed on the second input frame according to the second orientation information to generate a second calibrated frame corresponding to the predicted orientation. One of a plurality of extrapolated frames corresponding to the target time spot is generated according to the first calibrated frame and the second calibrated frame.

Another aspect of the present invention is to provide a frame rendering apparatus used in a head-mounted device. The frame rendering apparatus includes a storage module, a motion sensor and a processing module. The storage module is configured to store a plurality of computer-executable instructions. The processing module is electrically coupled to the storage module and the motion sensor and is configured to retrieve and execute the computer-executable instructions to perform a frame rendering method when the computer-executable instructions are executed. The frame rendering method includes the steps outlined below. A sequence of input frames are received. For each two of the consecutive input frames that include a first input frame corresponding to a first time spot and a second input frame next to the first frame and corresponding to a second time spot, the steps outlined below are performed. First orientation information corresponding to the first input frame and second orientation information corresponding to the second input frame are retrieved from the motion sensor. Predicted orientation information of a predicted orientation corresponding to a target time spot is generated according to the first orientation information and the second orientation information, wherein the target time spot is between the second time spot and a third time spot of a third input frame second input frame. Orientation calibration is performed on the first input frame according to the first orientation information and the predicted orientation information to generate a first calibrated frame corresponding to the predicted orientation and the orientation calibration is performed on the second input frame according to the second orientation information and the predicted orientation information to generate a second calibrated frame corresponding to the predicted orientation. One of a plurality of extrapolated frames corresponding to the target time spot is generated according to the first calibrated frame and the second calibrated frame.

Yet another aspect of the present invention is to provide a non-transitory computer readable storage medium that stores a computer program including a plurality of computer-executable instructions to perform a frame rendering method used in a frame rendering apparatus used in a head-mounted device, the frame rendering apparatus at least includes a storage module, a motion sensor and a processing module electrically coupled to the storage module and the motion sensor and configured to retrieve and execute the computer-executable instructions to perform a frame rendering method when the computer-executable instructions are executed. The frame rendering method includes the steps outlined below. A sequence of input frames are received. For each two of the consecutive input frames that include a first input frame corresponding to a first time spot and a second input frame next to the first frame and corresponding to a second time spot, the steps outlined below are performed. First orientation information corresponding to the first input frame and second orientation information corresponding to the second input frame are retrieved from the motion sensor. Predicted orientation information of a predicted orientation corresponding to a target time spot is generated according to the first orientation information and the second orientation information, wherein the target time spot is between the second time spot and a third time spot of a third input frame second input frame. Orientation calibration is performed on the first input frame according to the first orientation information and the predicted orientation information to generate a first calibrated frame corresponding to the predicted orientation and the orientation calibration is performed on the second input frame according to the second orientation information and the predicted orientation information to generate a second calibrated frame corresponding to the predicted orientation. One of a plurality of extrapolated frames corresponding to the target time spot is generated according to the first calibrated frame and the second calibrated frame.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
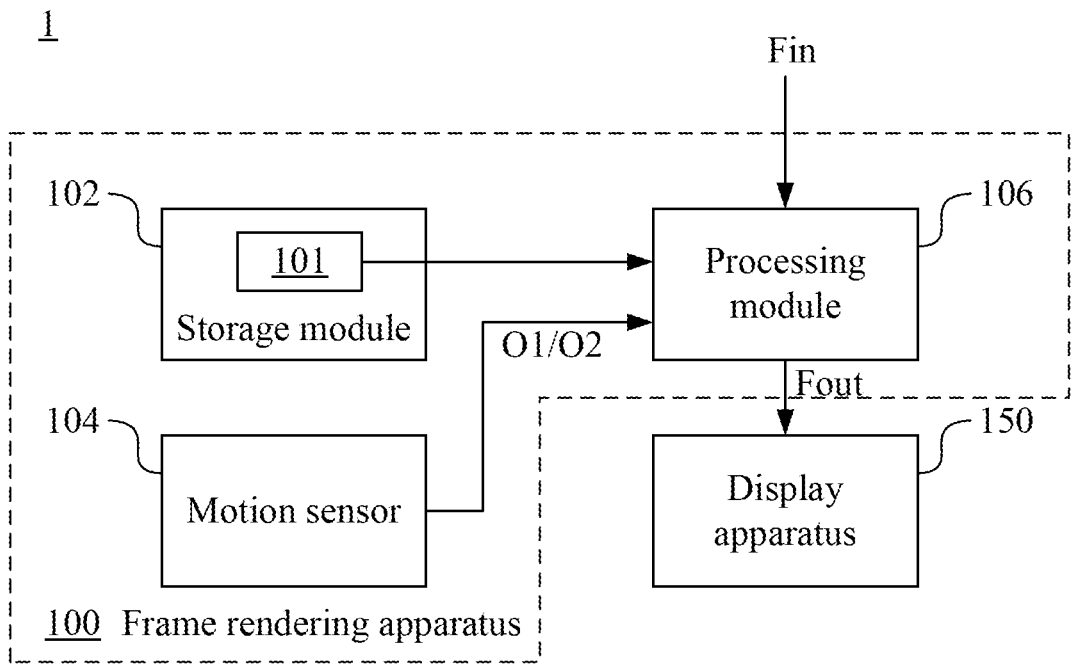
FIG. 1 is a block diagram of a head-mounted device in an embodiment of the present invention.

Reference will now be made in detail to the present embodiments of the disclosure, examples of which are illustrated in the accompanying drawings. Wherever possible, the same reference numbers are used in the drawings and the description to refer to the same or like parts.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Reference is now made to FIG. 1. FIG. 1 is a block diagram of a head-mounted device 1 in an embodiment of the present invention.

In an embodiment, the head-mounted device 1 includes a frame rendering apparatus 100 and a display apparatus 150. The head-mounted device 1 can be wear by a user. More specifically, in an embodiment, the frame rendering apparatus 100 is configured to receive and perform frame rendering on a sequence of input frames Fin to generate a sequence of output frames Fout. Further, the display apparatus 150 is configured to display the output frames Fout for the user to perceive.

By performing frame rendering of the input frames Fin, a high frame-rate of the displayed frames can be obtained such that the user using the head-mounted device 1 can have a better virtual reality experience.

The frame rendering apparatus 100 includes a storage module 102, a motion sensor 104 and a processing module 106.

In an embodiment, the storage module 102 can be such as, but not limited to CD ROM, RAM, ROM, floppy disk, hard disk or optic magnetic disk. The storage module 102 is configured to store a plurality of computer-executable instructions 101.

The motion sensor 104 is configured to detect orientation information of the head-mounted device 1. In an embodiment, the motion sensor 104 is such as, but not limited to a G sensor. It is appreciated that in different embodiments, the number of the motion sensor 104 can be one or more than one. The present invention is not limited thereto.

The processing module 106 is electrically coupled to the storage module 102 and the motion sensor 104. In an embodiment, the processing module 106 is configured to retrieve and execute the computer-executable instructions 101 to operate the function of the frame rendering apparatus 100 accordingly.

In an embodiment, the processing module 106 receives input frames Fin to perform frame rendering thereon.

More specifically, the processing module 106 performs frame rendering on each two of the consecutive input frames in the received sequence of input frames Fin, in which the two consecutive input frames include a first input frame corresponding to a first time spot and a second input frame corresponding to a second time spot next to the first time spot. The frame rendering result, which includes one of a plurality extrapolated frames, is generated at a target time spot.

Consequently, a plurality of extrapolated frames each corresponding to two of the consecutive input frames are generated.

Figure 2:
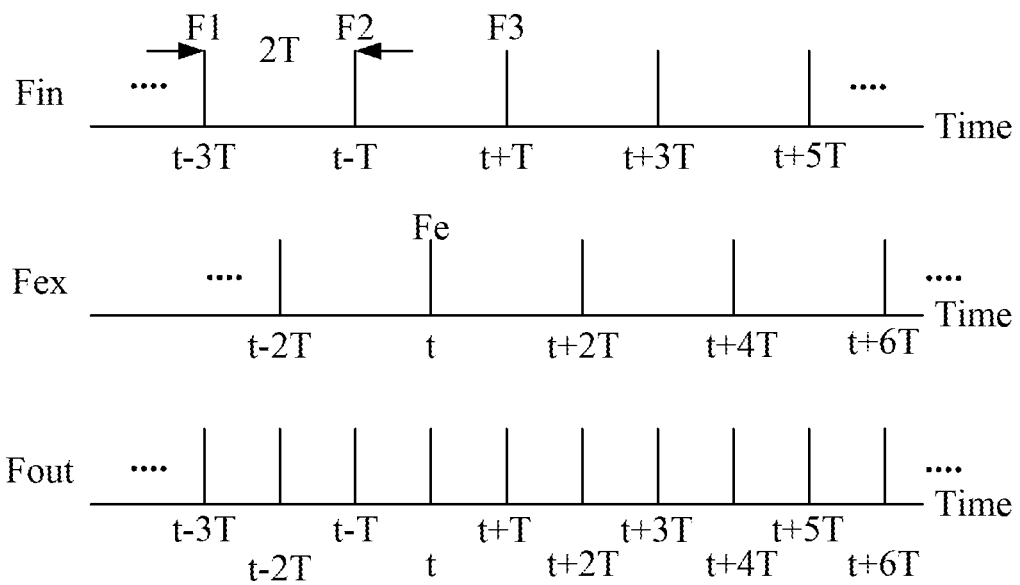
FIG. 2 is a timing diagram of the input frames and the extrapolated frames in an embodiment of the present invention.

Reference is now made to FIG. 2. FIG. 2 is a timing diagram of the input frames Fin and the extrapolated frames Fex in an embodiment of the present invention.

In an embodiment, for one of the extrapolated frames Fex, which is the extrapolated frame Fe, the target time spot is t. In order to generate the extrapolated frame Fe, two consecutive input frames that include the first input frame F1 corresponding to a first time spot and a second input frame F2 corresponding to a second time spot next to the first time spot.

In an embodiment, the target time spot t is between the second time spot and a third time spot of a third input frame F3 next to the second input frame F2. In an embodiment, the first time spot is t−3T, the second time spot is t−T and the third time spot is t+T, in which T is a half of the time period between each two of the consecutive input frames. In other words, 2T is the time period between each two of the consecutive input frames and is also an inverse of the frame rate of the input frames Fin.

In an embodiment, after performing frame rendering, the processing module 106 displays the output frames Fout that includes the input frames Fin and the extrapolated frames Fex on the display apparatus 150. The user wearing the head-mounted device 1 can thus perceive the displayed frames with high frame-rate.

Figure 3:
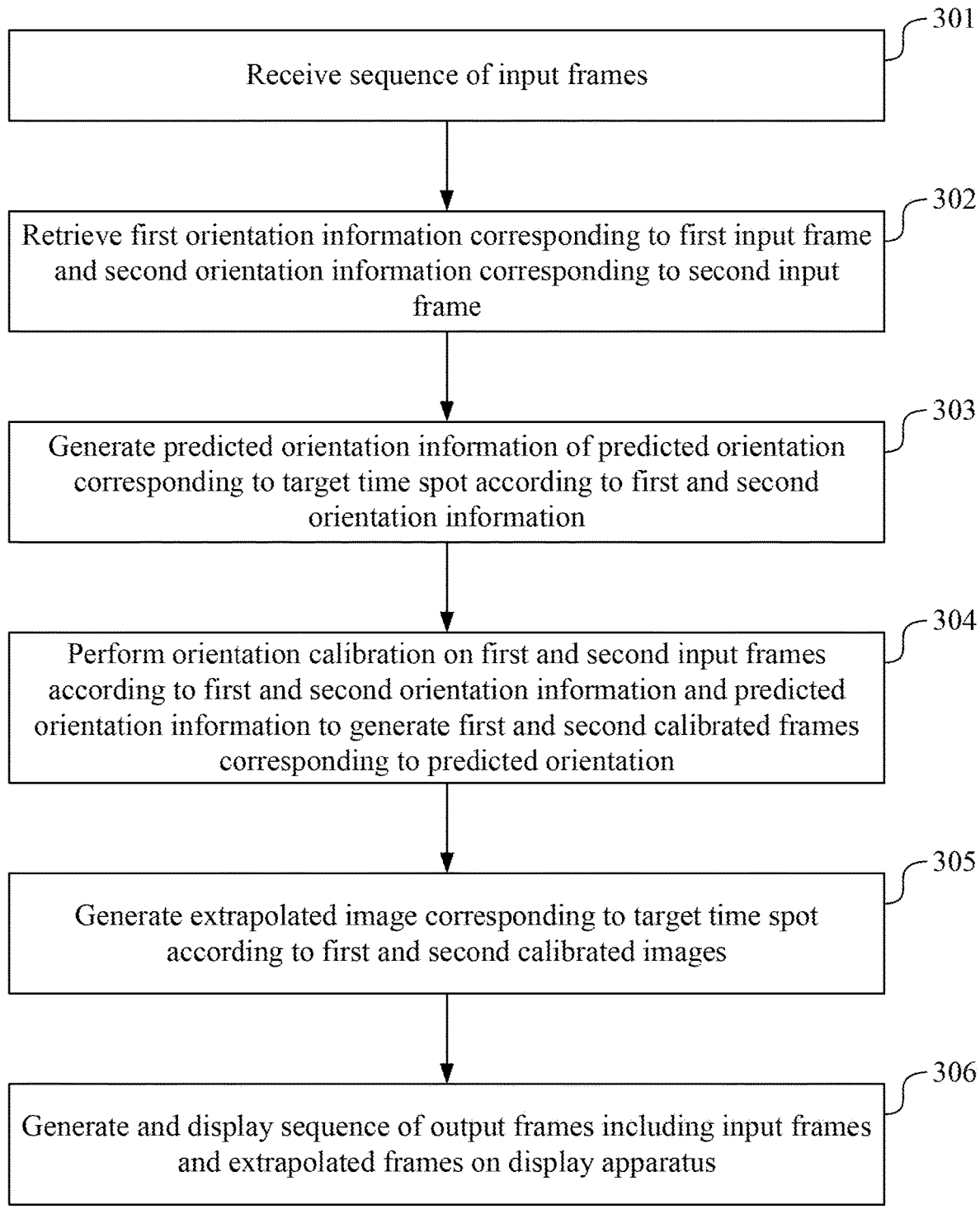
FIG. 3 is a flow chart of a frame rendering method in an embodiment of the present invention.
Figure 4:
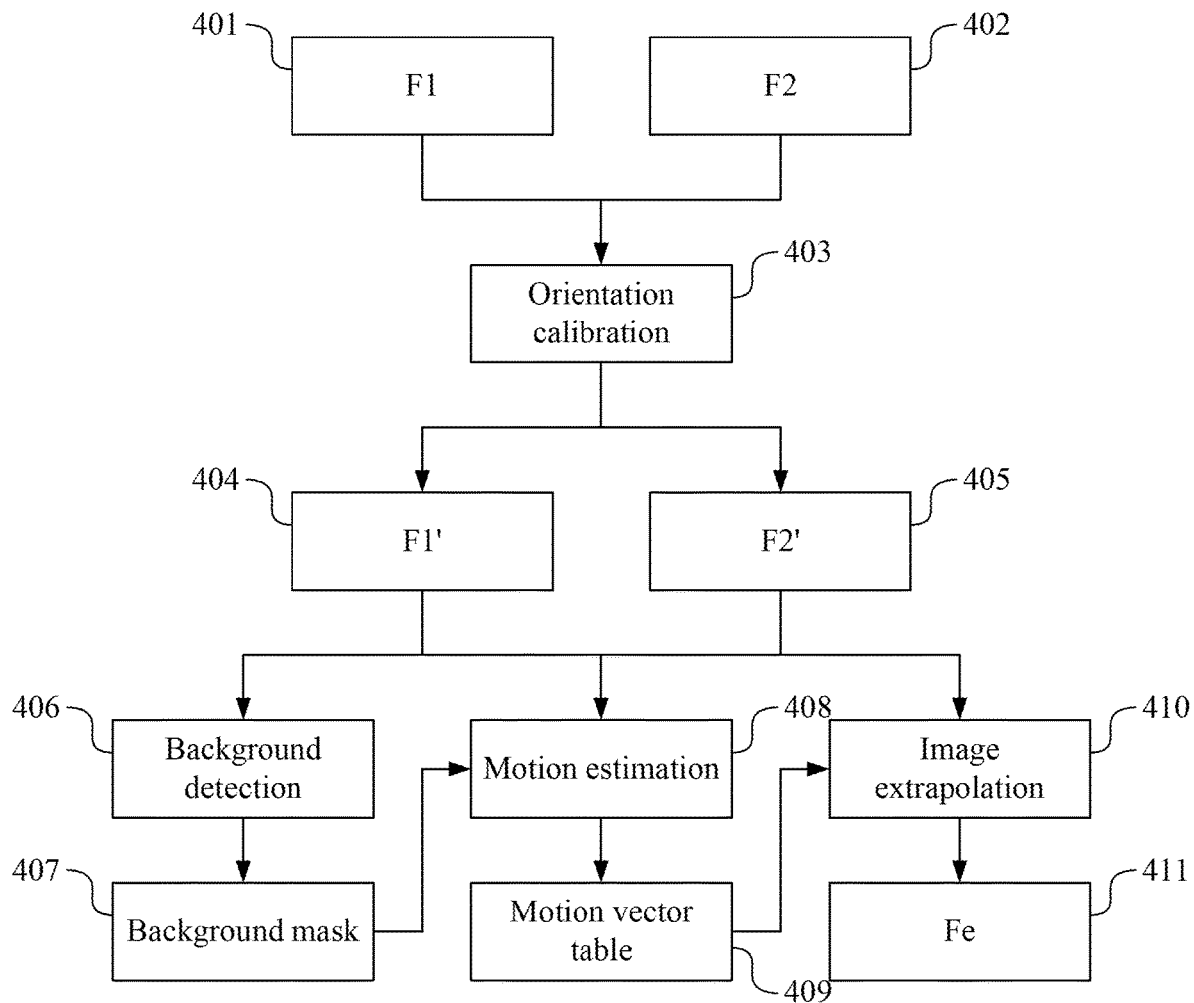
FIG. 4 is a diagram illustrating the objects and the actions within the process of the frame rendering method in an embodiment of the present invention.

Reference is now made to FIG. 3 and FIG. 4 at the same time. The detail of the operation of the frame rendering apparatus 100 is described in the following paragraphs in accompany with FIG. 3 and FIG. 4.

FIG. 3 is a flow chart of a frame rendering method 300 in an embodiment of the present invention. The frame rendering method 300 can be used in the frame rendering apparatus 100 illustrated in FIG. 1. More specifically, in an embodiment, the computer-executable instructions 100 operate as the frame rendering apparatus 100 when being executed by the processing module 106 to perform the frame rendering method 300.

FIG. 4 is a diagram illustrating the objects and the actions within the process of the frame rendering method 300 in an embodiment of the present invention.

The frame rendering method 300 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 301, the sequence of input frames Fin are received, in which two consecutive input frames F1 and F2 are illustrated in blocks 401 and 402 respectively in FIG. 4.

In step 302, first orientation information O1 corresponding to the first input frame F1 and second orientation information O2 corresponding to the second input frame F2 are retrieved from the motion sensor 104.

In an embodiment, the first orientation information O1 includes the information of the orientation of the head-mounted device 1 corresponding to the first input frame F1, i.e. corresponding to the first time spot t-3T, detected by the motion sensor 104.

The second orientation information O2 includes the information of the orientation of the head-mounted device 1 corresponding to the second input frame F2, i.e. corresponding to the second time spot t-T, detected by the motion sensor 104.

In step 303, predicted orientation information (not illustrated) of a predicted orientation corresponding to the target time spot t is generated according to the first orientation information O1 and the second orientation information O2.

In an embodiment, a moving trajectory of the head-mounted device 1 between the first time spot t-3T and the second time spot t-T can be calculated according to the first orientation information O1 and the second orientation information O2. As a result, the predicted orientation information can be obtained by using extrapolation based on the moving trajectory.

In step 304, orientation calibration, illustrated as block 403 in FIG. 4, is performed on the first input frame F1 according to the first orientation information O1 and the predicted orientation information to generate a first calibrated frame F1' corresponding to the predicted orientation, illustrated as block 404 in FIG. 4. The orientation calibration is performed on the second input frame F2 according to the second orientation information O2 and the predicted orientation information to generate a second calibrated frame F2', illustrated as block 405 in FIG. 4, corresponding to the predicted orientation.

In an embodiment, a predicted model-view-projection (MVP) matrix can be obtained according to the predicted orientation information.

Further, the first input frame F1 is projected to a world space by multiplying the first input frame F1 by an inverse of the MVP matrix corresponding to the first time spot t-3T. The projected first input frame is further projected to a screen space by multiplying the projected first input frame by the predicted MVP matrix to generate the first calibrated frame.

Similarly, the second input frame F2 is projected to the world space by multiplying the second input frame F2 by the inverse of the MVP matrix corresponding to the second time spot t-T. The projected second input frame is further projected to the screen space by multiplying the projected second input frame by the predicted MVP matrix to generate the second calibrated frame.

As a result, by performing the orientation calibration, the orientation of the first input frame F1 and the second input frame F2 can be calibrated to be aligned with the predicted orientation.

In step 305, one of the extrapolated frames Fex corresponding to the target time spot t, illustrated as block 411 in FIG. 4, is generated according to the first calibrated frame F1' and the second calibrated frame F2'.

In an embodiment, a background detection, illustrated as block 406 in FIG. 4, is performed according to the first calibrated frame F1' and the second calibrated frame F2' to generate a background mask illustrated as block 407 in FIG. 4. As a result, the objects in the foreground and the objects in the background of the first calibrated frame F1' and the second calibrated frame F2' can be distinguished. The background objects can thus be masked.

Subsequently, a motion estimation, illustrated as block 408 in FIG. 4, is performed between the first calibrated frame F1' and the second calibrated frame F2' to generate a motion vector table, illustrated as block 409 in FIG. 4. In an embodiment, the motion estimation 408 is performed based on the background mask 407. Due to the background mask 407 generated previously, unmoved pixels in the first calibrated frame F1' and the second calibrated frame F2' can be neglected to save the computation resource.

As a result, in an embodiment, the motion vector table 409 includes the motion vectors of the foreground objects in the first calibrated frame F1' and the second calibrated frame F2'.

Moreover, a frame extrapolation, illustrated as block 410 in FIG. 4, is performed according to the first calibrated frame F1' and the second calibrated frame F2' based on the motion vector table 409 to generate the extrapolated frame Fe.

In step 306, the sequence of output frames Fout including the input frames Fin and the extrapolated frames Fe are generated and displayed on the display apparatus 150.

The frame rendering apparatus 100 and the frame rendering method 300 in the present invention can accomplish a high frame rate display result by performing preprocessing before the frames are displayed. Additional hardware cost is thus avoided.

It should be noted that, in some embodiments, the frame rendering method 300 may be implemented as a computer program. When the computer program is executed by a computer, an electronic device, or the processing module 106 in FIG. 1, this executing device performs the frame rendering method 300. The computer program can be stored in a non-transitory computer readable storage medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A frame rendering method used in a head-mounted device comprising:
   receiving a sequence of input frames;
   for each two of the consecutive input frames that comprises a first input frame corresponding to a first time spot and a second input frame next to the first frame and corresponding to a second time spot, performing the steps of:
   retrieving first orientation information corresponding to the first input frame and second orientation information corresponding to the second input frame from a motion sensor of the head-mounted device;

generating predicted orientation information of a predicted orientation corresponding to a target time spot according to the first orientation information and the second orientation information, wherein the target time spot is between the second time spot and a third time spot of a third input frame next to the second input frame;

performing orientation calibration on the first input frame according to the first orientation information and the predicted orientation information to generate a first calibrated frame corresponding to the predicted orientation, and performing orientation calibration on the second input frame according to the second orientation information and the predicted orientation information to generate a second calibrated frame corresponding to the predicted orientation; and generating one of a plurality of extrapolated frames corresponding to the target time spot according to the first calibrated frame and the second calibrated frame.

2. The frame rendering method of claim 1, wherein the step of generating the extrapolated frames further comprises:

performing a motion estimation between the first calibrated frame and the second calibrated frame to generate a motion vector table; and performing a frame extrapolation according to the first calibrated frame and the second calibrated frame based on the motion vector table to generate the one of the extrapolated frames.

3. The frame rendering method of claim 2, wherein before the step of performing the motion estimation further comprises:

performing a background detection according to the first calibrated frame and the second calibrated frame to generate a background mask;

wherein the motion estimation is performed between the first calibrated frame and the second calibrated frame based on the background mask to neglect unmoved pixels in the first calibrated frame and the second calibrated frame.

4. The frame rendering method of claim 1, wherein the target time spot is t, the first time spot is t−3T, the second time spot is t−T and the third time spot is t+T, wherein T is a half of a time period between each two of the consecutive input frames.

5. The frame rendering method of claim 1, wherein the step of performing orientation calibration on the first input frame and the second input frame further comprises:

obtaining a predicted model-view-projection (MVP) matrix according to the predicted orientation information;

projecting the first input frame to a world space by multiplying the first input frame by an inverse of the MVP matrix corresponding to the first time spot and further projecting the projected first input frame to a screen space by multiplying the projected first input frame by the predicted MVP matrix to generate the first calibrated frame; and projecting the second input frame to the world space by multiplying the second input frame by the inverse of the MVP matrix corresponding to the second time spot and further projecting the projected second input frame to the screen space by multiplying the projected second input frame by the predicted MVP matrix to generate the second calibrated frame.

6. The frame rendering method of claim 1, further comprising:

generating a sequence of output frames comprising the input frames and the extrapolated frames; and displaying the output frames on a display apparatus of the head-mounted device.

7. A frame rendering apparatus used in a head-mounted device comprising:

a storage module configured to store a plurality of computer-executable instructions;

a motion sensor; and a processing module electrically coupled to the storage module and the motion sensor and configured to retrieve and execute the computer-executable instructions to perform a frame rendering method when the computer-executable instructions are executed, wherein the frame rendering method comprises:

receiving a sequence of input frames;

for each two of the consecutive input frames that comprises a first input frame corresponding to a first time spot and a second input frame next to the first frame and corresponding to a second time spot, performing the steps of:

retrieving first orientation information corresponding to the first input frame and second orientation information corresponding to the second input frame from the motion sensor;

generating predicted orientation information of a predicted orientation corresponding to a target time spot according to the first orientation information and the second orientation information, wherein the target time spot is between the second time spot and a third time spot of a third input frame next to the second input frame;

performing orientation calibration on the first input frame according to the first orientation information and the predicted orientation information to generate a first calibrated frame corresponding to the predicted orientation and performing orientation calibration on the second input frame according to the second orientation information and the predicted orientation information to generate a second calibrated frame corresponding to the predicted orientation; and generating one of a plurality of extrapolated frames corresponding to the target time spot according to the first calibrated frame and the second calibrated frame.

8. The frame rendering apparatus of claim 1, wherein the step of generating the extrapolated frames further comprises:

performing a motion estimation between the first calibrated frame and the second calibrated frame to generate a motion vector table; and performing a frame extrapolation according to the first calibrated frame and the second calibrated frame based on the motion vector table to generate the one of the extrapolated frames.

9. The frame rendering apparatus of claim 8, wherein before the step of performing the motion estimation further comprises:

performing a background detection according to the first calibrated frame and the second calibrated frame to generate a background mask;

wherein the motion estimation is performed between the first calibrated frame and the second calibrated frame based on the background mask to neglect unmoved pixels in the first calibrated frame and the second calibrated frame.

10. The frame rendering apparatus of claim 7, wherein the target time spot is t, the first time spot is t−3T, the second time spot is t−T and the third time spot is t+T, wherein T is a half of a time period between each two of the consecutive input frames.

11. The frame rendering apparatus of claim 7, wherein the step of performing orientation calibration on the first input frame and the second input frame further comprises:
 obtaining a predicted MVP matrix according to the predicted orientation information;
 projecting the first input frame to a world space by multiplying the first input frame by an inverse of the MVP matrix corresponding to the first time spot and further projecting the projected first input frame to a screen space by multiplying the projected first input frame by the predicted MVP matrix to generate the first calibrated frame; and
 projecting the second input frame to the world space by multiplying the second input frame by the inverse of the MVP matrix corresponding to the second time spot and further projecting the projected second input frame to the screen space by multiplying the projected second input frame by the predicted MVP matrix to generate the second calibrated frame.

12. The frame rendering apparatus of claim 7, wherein the frame rendering method further comprises:
 generating a sequence of output frames comprising the input frames and the extrapolated frames; and
 displaying the output frames on a display apparatus of the head-mounted device.

13. A non-transitory computer readable storage medium that stores a computer program comprising a plurality of computer-executable instructions to perform a frame rendering method used in a frame rendering apparatus used in a head-mounted device, the frame rendering apparatus at least comprises a storage module, a motion sensor and a processing module electrically coupled to the storage module and the motion sensor and configured to retrieve and execute the computer-executable instructions to perform a frame rendering method when the computer-executable instructions are executed, wherein the frame rendering method comprises:
 receiving a sequence of input frames;
 for each two of the consecutive input frames that comprises a first input frame corresponding to a first time spot and a second input frame next to the first frame and corresponding to a second time spot, performing the steps of:
  retrieving first orientation information corresponding to the first input frame and second orientation information corresponding to the second input frame from the motion sensor;
  generating predicted orientation information of a predicted orientation corresponding to a target time spot according to the first orientation information and the second orientation information, wherein the target time spot is between the second time spot and a third time spot of a third input frame next to the second input frame;
  performing orientation calibration on the first input frame according to the first orientation information and the predicted orientation information to generate a first calibrated frame corresponding to the predicted orientation and performing orientation calibration on the second input frame according to the second orientation information and the predicted orientation information to generate a second calibrated frame corresponding to the predicted orientation; and
 generating one of a plurality of extrapolated frames corresponding to the target time spot according to the first calibrated frame and the second calibrated frame.

14. The non-transitory computer readable storage medium of claim 13, wherein the step of generating the extrapolated frames further comprises:
 performing a motion estimation between the first calibrated frame and the second calibrated frame to generate a motion vector table; and
 performing a frame extrapolation according to the first calibrated frame and the second calibrated frame based on the motion vector table to generate the one of the extrapolated frames.

15. The non-transitory computer readable storage medium of claim 13, wherein before the step of performing the motion estimation further comprises:
 performing a background detection according to the first calibrated frame and the second calibrated frame to generate a background mask;
 wherein the motion estimation is performed between the first calibrated frame and the second calibrated frame based on the background mask to neglect unmoved pixels in the first calibrated frame and the second calibrated frame.

16. The non-transitory computer readable storage medium of claim 13, wherein the target time spot is t, the first time spot is t−3T, the second time spot is t−T and the third time spot is t+T, wherein T is a time period between each two of the consecutive input frames.

17. The non-transitory computer readable storage medium of claim 13, wherein the step of performing orientation calibration on the first input frame and the second input frame further comprises:
 obtaining a predicted MVP matrix according to the predicted orientation information;
 projecting the first input frame to a world space by multiplying the first input frame by an inverse of the MVP matrix corresponding to the first time spot and further projecting the projected first input frame to a screen space by multiplying the projected first input frame by the predicted MVP matrix to generate the first calibrated frame; and
 projecting the second input frame to the world space by multiplying the second input frame by the inverse of the MVP matrix corresponding to the second time spot and further projecting the projected second input frame to the screen space by multiplying the projected second input frame by the predicted MVP matrix to generate the second calibrated frame.

18. The non-transitory computer readable storage medium of claim 13, wherein the frame rendering method further comprises:
 generating a sequence of output frames comprising the input frames and the extrapolated frames; and
 displaying the output frames on a display apparatus of the head-mounted device.

* * * * *